United States Patent
Stauffer

(10) Patent No.: US 7,550,231 B2
(45) Date of Patent: Jun. 23, 2009

(54) TIN-ZINC SECONDARY BATTERY

(76) Inventor: John E. Stauffer, 6 Pecksland Rd., Greenwich, CT (US) 06830

(*) Notice: Subject to any disclaimer, the term of this patent is extended or adjusted under 35 U.S.C. 154(b) by 0 days.

(21) Appl. No.: 11/834,790

(22) Filed: Aug. 7, 2007

(65) Prior Publication Data

US 2008/0090147 A1  Apr. 17, 2008

Related U.S. Application Data

(63) Continuation-in-part of application No. 11/546,793, filed on Oct. 12, 2006.

(51) Int. Cl.
- H01M 4/58 (2006.01)
- H01M 10/26 (2006.01)
- H01M 4/02 (2006.01)
- H01M 4/42 (2006.01)

(52) U.S. Cl. .......... 429/218.1; 429/206; 429/209; 429/229

(58) Field of Classification Search .......... 429/229, 429/224, 218.1, 206, 209
See application file for complete search history.

(56) References Cited

U.S. PATENT DOCUMENTS

| | | |
|---|---|---|
| 1,955,115 A | 4/1934 | Drumm |
| 3,447,971 A | 6/1969 | Ammerman |
| 3,862,861 A | 1/1975 | McClelland |
| 3,884,722 A * | 5/1975 | Tucholski .................. 429/54 |
| 5,501,924 A * | 3/1996 | Swierbut et al. ............ 429/224 |
| 5,705,050 A | 1/1998 | Sampson et al. |
| 2006/0035145 A1* | 2/2006 | Stauffer .................... 429/206 |

FOREIGN PATENT DOCUMENTS

| CN | 200407 B | 10/2003 |
|---|---|---|
| NL | 197602840 | 9/1977 |

OTHER PUBLICATIONS

Dobos, D., Electrochemical Data, 1975, Elsevier Scientific Publishing Company, New York, p. 262.*

* cited by examiner

Primary Examiner—Dah-Wei D Yuan
Assistant Examiner—Zachary Best
(74) Attorney, Agent, or Firm—Young Basile

(57) ABSTRACT

A rechargeable battery is provided with a positive electrode of tin, a negative electrode of zinc and an alkaline electrolyte. Upon charging, some tin is converted to stannic oxide, and zinc oxide is reduced to zinc. When the battery is discharged, stannic oxide is reduced to stannous oxide and zinc is oxidized to zinc oxide.

4 Claims, 1 Drawing Sheet

TIN-ZINC SECONDARY BATTERY

The application is a Continuation-in-Part of U.S. patent application Ser. No. 11/546,793 filed on Oct. 12, 2006 hereby incorporated by reference.

FIELD OF THE INVENTION

The present invention relates to a novel type of storage battery. The positive electrode is made of tin which, during charging, is converted to stannic oxide, and the negative electrode is made of zinc. The electrolyte consists of an alkaline aqueous solution of an alkali metal hydroxide or tetramethyl ammonium hydroxide to which various buffers, including carbonates, borates, silicates and phosphates are added. Upon discharge the stannic oxide is reduced to stannous oxide and the zinc is oxidized to zinc oxide.

BACKGROUND OF THE INVENTION

In a pending patent application, Ser. No. 11/249,223, the parent of which is Ser. No. 10/756,015 filed Jan. 13, 2004, a secondary battery was disclosed which comprised a positive electrode of lead, a negative electrode of zinc and an alkaline electrolyte. This battery shows considerable promise, including low cost and high energy density. It is handicapped, however, by weight, due to the lead electrode, which restricts applications where mobility is needed. Secondly, the toxicity of lead is a drawback.

SUMMARY OF THE DISCLOSURE

It is an object of the present invention to provide an improved storage battery that has maximum versatility and does not use a lead electrode.

A storage battery is fabricated from a positive electrode of tin and a negative electrode of zinc. During charging some tin is converted to stannic oxide. Upon discharge, stannic oxide is reduced to stannous oxide and zinc is oxidized to zinc oxide. These reactions are reversible such that the battery fulfills both functions of a secondary battery: supplying electricity on demand and storing or accumulating surplus electricity.

The electrolyte of the cell is alkaline. Aqueous solutions of bases provide the alkalinity. These bases include ammonia and the hydroxides of the alkali metals, namely, lithium, sodium, potassium and cesium. In addition, tetramethyl ammonium hydroxide may be employed.

Certain additives may be effective buffers in the electrolyte. These additives include carbonates, borates, silicates and phosphates.

BRIEF DESCRIPTION OF THE DRAWING

The single FIGURE shows a battery constructed in accordance with the invention.

DETAILED DESCRIPTION

Figure 1:
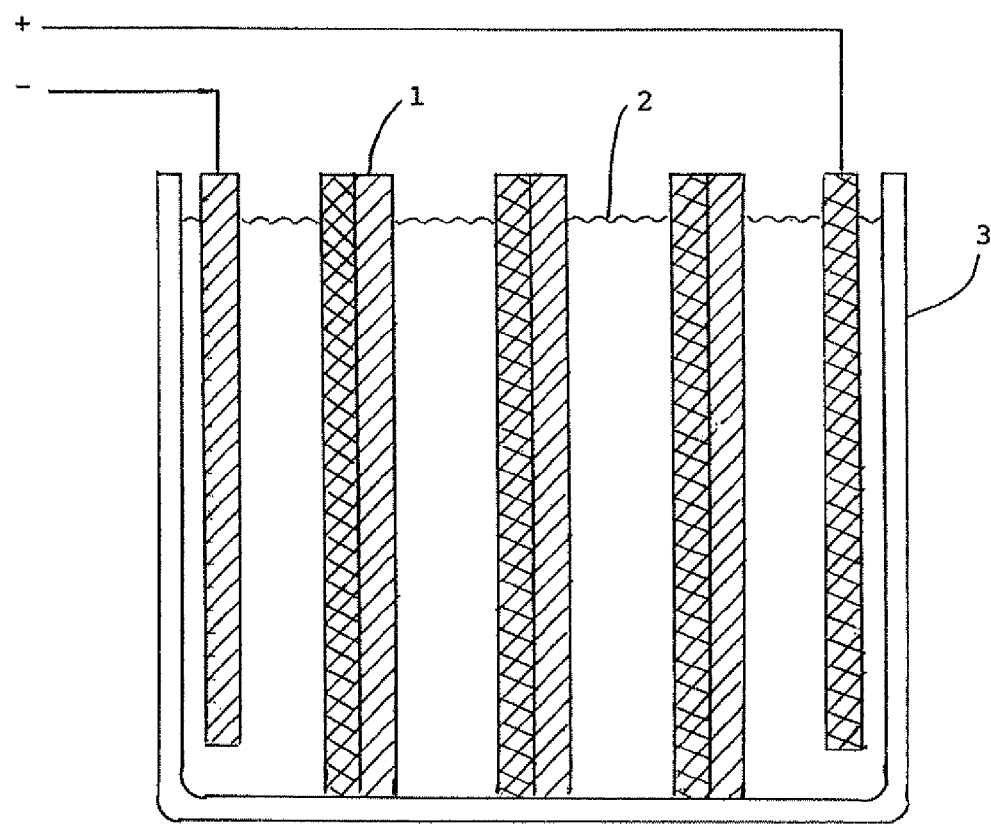

The theoretical potential of the battery of the present invention can be determined from the single electrode potentials. These potentials are given in the following equations that represent the reactions at each electrode.

Positive Electrode:

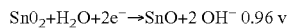
$SnO_2 + H_2O + 2e^- \rightarrow SnO + 2\ OH^-$   0.96 v   1.

Negative Electrode:

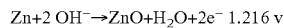
$Zn + 2\ OH^- \rightarrow ZnO + H_2O + 2e^-$   1.216 v   2.

When these equations are combined, the overall reaction for the cell is obtained as follows:

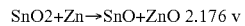
$SnO_2 + Zn \rightarrow SnO + ZnO$   2.176 v   3.

As the battery is discharged, there is no change in the average composition of the electrolyte although some concentration gradients will exist. During recharging of the cell, the reactions are reversed.

Negative electrodes of zinc have been employed in several types of secondary batteries. Tin, however, has never been reported as a positive electrode for such applications. One concern is the solubility of both stannous oxide and stannic oxide in concentrated alkali solutions.

Buffers are used to control the alkalinity of the electrolyte. These buffers may be selected from the group consisting of carbonates, borates, silicates and phosphates. They may be introduced by the corresponding acids or their respective salts.

Alkalinity is provided by compounds of the alkali metals, including lithium, sodium, potassium and cesium. Lithium has certain limitations because its carbonate and phosphate are practically insoluble in water. While ammonium hydroxide is basic in solution, its volatility restricts its use. Finally, tetramethyl ammonium hydroxide is known to be strongly alkaline.

The configuration of a tin-zinc cell is not restricted. A preferred design, however, is a bipolar battery wherein several cells are integrated into a single package. FIG. 1 illustrates such a design. Bipolar electrodes 1 are comprised of tin (crosshatch) and zinc (striped). These electrodes are immersed in the alkaline electrolyte 2, which is contained in the individual compartments formed by the electrodes and casing 3. Electrical leads connect to the end electrodes. Spacers (not shown) may be inserted between the electrodes in order to minimize the danger of short-circuits.

The bipolar cell has the advantage of maximizing electrode surfaces while minimizing the electrical resistance. Its increased output voltage may also be a plus. Applications for the battery of the present invention are almost limitless.

EXAMPLE 1

The experimental cell comprised a glass jar 1¾ in. diameter by 3½ in. high. The positive electrode consisted of a tin ingot 99.8% tin on metal basis, 1 in. wide by 0.37 in. thick. The negative electrode was fashioned from a sheet of zinc 1½ in. wide, removed from a size D dry cell of the Leclanché type. A spacer was cut from polypropylene sheet and inserted between the electrodes. The electrolyte was a household brand of ammonia solution. After charging the cell for 23 minutes at 4.5 v., an open circuit potential of 2.05 v. was observed for the cell. On discharge, the cell produced a current of 10 milliamps. At the conclusion of the run, both electrodes were bright and untarnished. The electrolyte was water white.

EXAMPLE 2

The same cell as the one in example 1 was used except a new electrolyte was employed. To prepare the electrolyte 87.9 g. of potassium bicarbonate was heated at 500° F. in an oven to convert it to potassium carbonate, which was dissolved in 150 ml. water. After charging the cell for 7 minutes at 3 v., an open circuit voltage of 2.1 v. was obtained. The cell produced a current of 80 milliamps and lit a light bulb. At the end of the run, the tin electrode had changed from silvery to a shiny dark brown, almost black, color. The zinc electrode had a smooth grey surface. The electrolyte was water white.

EXAMPLE 3

In this experiment, an electrolyte of sodium borate solution was used. To prepare the electrolyte, 35.0 g. of boric acid and 21.9 g. of sodium hydroxide were added to 125 ml. water. The same electrodes and container were used as in example 1. After charging the cell for 8 minutes at 3.5 v., an open circuit voltage of 2.15 v. was observed. Upon discharge, a current of 70 milliamps was obtained causing the light bulb to flicker. When the run was completed, the tin electrode had turned from silvery to a shiny brown color. The zinc electrode remained gray and in perfect condition. The electrolyte was water white.

What is claimed is:

1. A storage battery comprising:
    (a) a positive electrode comprised, essentially of tin, wherein during discharge, stannic oxide is reduced to stannous oxide and during charging stannous oxide is oxidized to stannic oxide;
    (b) a negative electrode of zinc; and
    (c) an alkaline electrolyte.
2. The storage battery of claim 1 in which the alkaline electrolyte is an aqueous solution of a hydroxide of an alkali metal.
3. The storage battery of claim 1 in which the alkaline electrolyte is an aqueous solution of tetramethyl ammonium hydroxide.
4. The storage battery of claim 1 in which the alkaline electrolyte contains a buffering agent selected from the group: carbonates, borates, silicates and phosphates.

* * * * *